United States Patent
Ye et al.

(10) Patent No.: US 12,167,456 B2
(45) Date of Patent: Dec. 10, 2024

(54) METHODS AND APPARATUS FOR INTER-UE COORDINATED RESOURCE ALLOCATION IN WIRELESS COMMUNICATION

(71) Applicant: Apple Inc., Cupertino, CA (US)

(72) Inventors: Chunxuan Ye, Beijing (CN); Zhibin Wu, Beijing (CN); Dawei Zhang, Cupertino, CA (US); Haijing Hu, Cupertino, CA (US); Haitong Sun, Cupertino, CA (US); Hong He, Cupertino, CA (US); Oghenekome Oteri, Cupertino, CA (US); Sudhir K Baghel, Cupertino, CA (US); Wei Zeng, Cupertino, CA (US); Weidong Yang, Cupertino, CA (US); Yushu Zhang, Cupertino, CA (US); Sigen Ye, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/606,705

(22) PCT Filed: Oct. 15, 2020

(86) PCT No.: PCT/CN2020/121124
§ 371 (c)(1),
(2) Date: Oct. 26, 2021

(87) PCT Pub. No.: WO2022/077332
PCT Pub. Date: Apr. 21, 2022

(65) Prior Publication Data
US 2023/0262774 A1 Aug. 17, 2023

(51) Int. Cl.
*H04W 74/0808* (2024.01)
*H04L 1/08* (2006.01)
*H04W 72/25* (2023.01)

(52) U.S. Cl.
CPC ........... *H04W 74/0825* (2013.01); *H04L 1/08* (2013.01); *H04W 72/25* (2023.01)

(58) Field of Classification Search
CPC ............. H04W 74/0825; H04W 72/25; H04W 72/569; H04W 72/20; H04W 74/0808;
(Continued)

(56) References Cited

U.S. PATENT DOCUMENTS

2020/0100119 A1    3/2020  Byun et al.
2021/0176669 A1*   6/2021  Fakoorian ............. H04W 72/20
(Continued)

FOREIGN PATENT DOCUMENTS

CN    110692276 A    1/2020
CN    111182654 A    5/2020
(Continued)

OTHER PUBLICATIONS

Ericsson, "Feasibility and benefits of mode 2 enhancements for inter-UE coordination", 3GPP TSG-RAN WG1 Meeting #102-e, e-Meeting, R1-2006445, Aug. 17-28, 2020, 7 pages.
(Continued)

*Primary Examiner* — Habte Mered
(74) *Attorney, Agent, or Firm* — Womble Bond Dickinson (US) LLP

(57) ABSTRACT

A user equipment (UE) device comprising a processor configured to perform operations is described. In an exemplary embodiment, the operations include comprising establishing a sidelink session with a transmitting UE; configuring the sidelink session to support coordinated resource selection prior to performing the local sensing; performing a local sensing; receiving a PSCCH and a PSSCH from the transmitting UE. The transmitting UE reserves multiple resources. The processor is further configured to perform operations including determining whether a collision hap-
(Continued)

Configuration based coordination message transmissions pens among the multiple reserved resources; and transmitting the coordination message to the transmitting UE.

20 Claims, 11 Drawing Sheets

(58) Field of Classification Search
CPC .... H04W 76/14; H04W 28/0284; H04L 1/08; H04L 1/1854
See application file for complete search history.

(56) References Cited

U.S. PATENT DOCUMENTS

| | | | |
|---|---|---|---|
| 2021/0385696 A1* | 12/2021 | Yang | H04L 1/1812 |
| 2022/0046664 A1* | 2/2022 | Hosseini | H04W 28/26 |
| 2022/0095280 A1* | 3/2022 | Farag | H04W 72/23 |
| 2022/0394560 A1* | 12/2022 | Yu | H04W 72/0446 |
| 2023/0224929 A1* | 7/2023 | Zhang | H04W 72/541 |
| | | | 370/329 |
| 2023/0309134 A1* | 9/2023 | Leon Calvo | H04W 72/563 |

FOREIGN PATENT DOCUMENTS

| | | |
|---|---|---|
| WO | 2019/061180 A1 | 4/2019 |
| WO | 2020/135558 A1 | 7/2020 |

OTHER PUBLICATIONS

European Search Report and Search Opinion received for European Application No. 20957111.6, mailed on Apr. 3, 2024, 11 pages.
InterDigital Inc., "Resource Allocation for NR V2X", 3GPP RAN WG1 Meeting #95, Spokane, USA, R1-1813164, Nov. 12-16, 2018, pp. 1-9.
International Preliminary Report on Patentability received for PCT Patent Application No. PCT/CN2020/121124, mailed on Apr. 27, 2023, 6 pages.
International Search Report and Written Opinion received for PCT Patent Application No. PCT/CN2020/121124, mailed on Jul. 16, 2021, 7 pages.
LG Electronics, "Discussion on feasibility and benefits for mode 2 enhancement", 3GPP TSG RAN WG1 Meeting #102-e, e-Meeting, R1-2005749, Aug. 17-28, 2020, 9 pages.
Mediatek Inc, "Discussion on Mode 2 enhancements", 3GPP TSG RAN WG1 #102, e-Meeting, R1-2005645, Aug. 17-28, 2020, pp. 1-3.
Qualcomm Inc., "Reliability and Latency Enhancements for Mode 2", 3GPP TSG RAN WG1 Meeting #102-e, R1-2006829, Aug. 17-28, 2020, 9 pages.

* cited by examiner

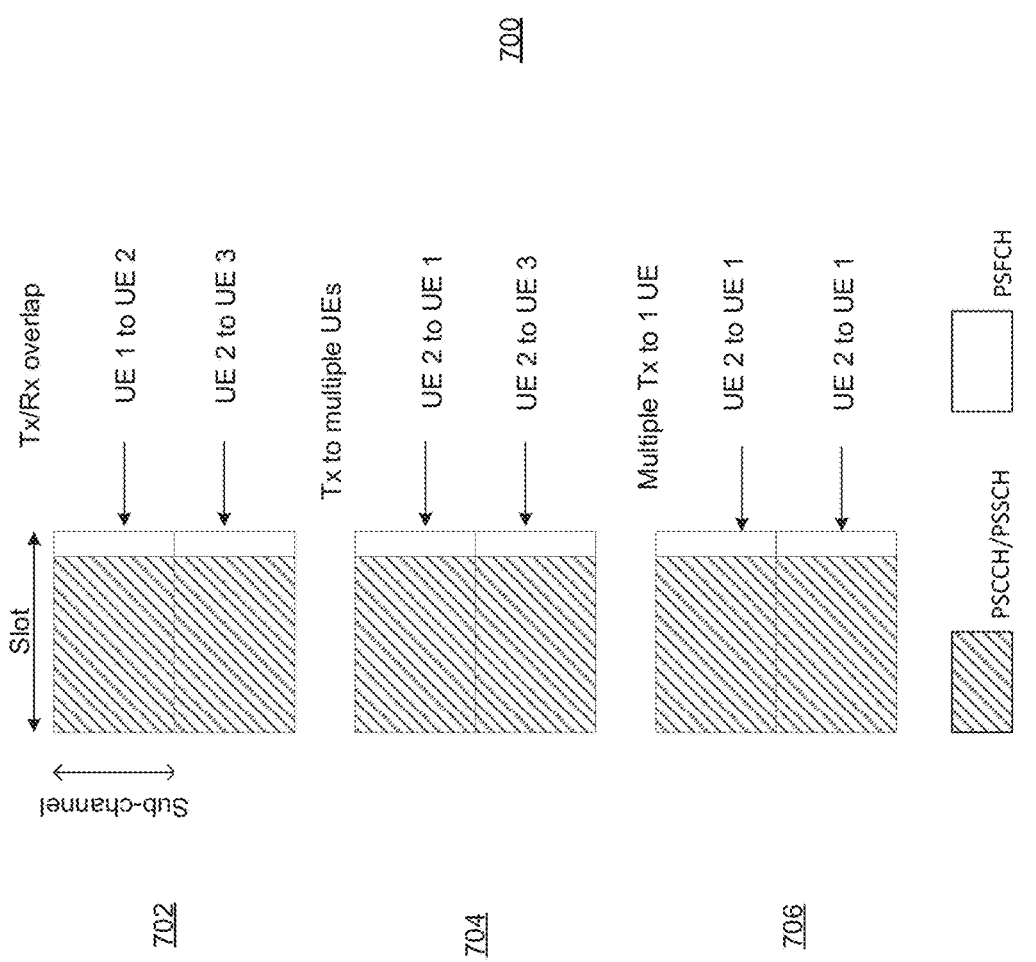

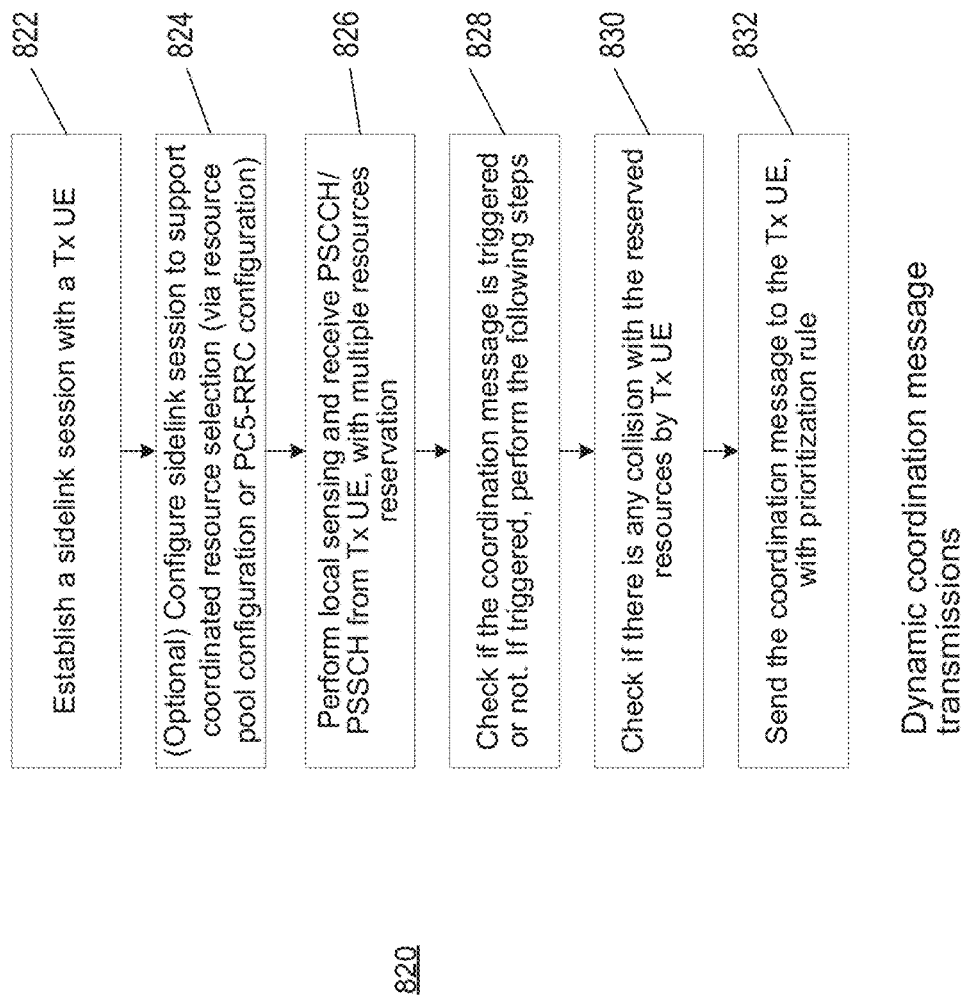

METHODS AND APPARATUS FOR INTER-UE COORDINATED RESOURCE ALLOCATION IN WIRELESS COMMUNICATION

RELATED APPLICATIONS

The present application is the national phase of International Application No. PCT/CN2020/121124, filed on Oct. 15, 2020 and the disclosure of which is hereby incorporated herein by reference in its entirety.

FIELD OF INVENTION

This invention relates generally to wireless technology and more particularly to a coordinated resource allocation for a sidelink communication.

BACKGROUND OF THE INVENTION

In a wireless communications network, a user equipment (UE) determines a number of available resources (e.g., sidelink resources) to communicate data and selects a subset of these resources for use in communicating the data based on resource allocation schemes. New Radio (NR) (Vehicle-to-everything) V2X R16 support Mode 1 and Mode 2 resource allocation schemes. In an existing Mode 2 resource allocation scheme, the UE selects sidelink resources (e.g., sidelink transmission resources) in a manner to minimize collision probability and to reduce an interference level. Specifically, in Mode 2 resource allocation scheme for NR V2X, a transmitter UE autonomously selects sidelink transmission resources based on its own channel sensing mechanism and a resource selection procedure.

In NR V2X Mode 2, resource allocation can include UE determining sidelink transmission resource within a set of sidelink resources based on a network configuration or being pre-configured. The determination of the sidelink transmission resource can include four steps including resource pool pre-configuration, sensing, sidelink data ready for transmission, resource selection and re-selection, and sidelink transmission with resource reservation.

However, the existing Mode 2 resource allocation scheme lacks a coordination between UE to indicate feasible resource when there is a resource collision among the resources reserved for a subsequent transmission. Thus, there is a need for an enhanced mechanism for the UEs to coordinate resource selection, thereby assisting the transmitting UE to efficiently perform subsequent sidelink transmission based on the enhanced mechanism. The enhanced mechanism may reduce the size of a payload of the feedback channel. Additionally, the embodiments of the mechanism as described in the present disclosure can enhance the reliability of the sidelink resource selection and the sidelink transmission by reducing collision probability and by avoiding half-duplex issues. Subsequently, the sidelink resource utilization efficiency can be improved.

SUMMARY OF THE DESCRIPTION

A method that coordinates resource coordination between user equipment (UE) for a sidelink communication is described.

In one aspect of the disclosure, embodiments of the present disclosure provide a receiving user equipment (UE) device including an antenna a memory, a RF circuitry commutatively coupled to the antenna, and a processor configured to perform operations including establishing a sidelink session with a transmitting UE; configuring the sidelink session to support coordinated resource selection; performing a local sensing; receiving a physical sidelink control channel (PSCCH) and a physical sidelink shared channel (PSSCH) from the transmitting UE. The transmitting UE reserves multiple resources. The processor is further configured to perform operations including determining whether a collision occurs among the multiple reserved resources based on the performed local sensing or UE scheduling information; and transmitting the coordination message to the transmitting UE.

In some embodiments, the processor is further configured to perform operations including determining whether the coordination message is triggered before determining whether the collision occurs among the multiple reserved resources.

In some embodiments, performing the local sensing includes decoding a sidelink control information (SCI) from neighboring UEs; and measuring an interference level from the neighboring UEs. The coordination message includes information on a specific resource reserved by the transmitting UE at specific time slot and in a specific frequency. The coordination message includes an indication indicating whether the specific resource reserved by the transmitting UE is a preferred resource for a subsequent transmission. The coordination message is applicable to reserved resources for a subsequent transmission. The subsequent transmission is either for a retransmission of a data or for a transmission or a retransmission of a new data. The coordination message is transmitted or received via a physical channel including a Physical Sidelink Feedback Coordination Channel (PSFCCH) or a Physical Sidelink Feedback Channel (PSFCH).

In another further aspect of the disclosure, embodiments of the present disclosure also provide a transmitting UE including a processor configured to perform operations including establishing a sidelink session with a receiving UE; configuring the sidelink session to support coordinated resource selection; performing a sensing and resource selection; transmitting a PSCCH and a PSSCH to the receiving UE. The transmitting UE reserves multiple resources; receiving a coordination message from the receiving UE. The processor is further configured to perform operations including determining whether the coordination message indicates reserved resources collision; determining whether to perform resource reselection; performing resource reselection for a subsequent transmission if the coordination message indicates reserved resources collision; performing the subsequent transmission using re-selected resources; and performing the subsequent transmission using the reserved resources if the coordination message does not indicate reserved resources collision.

In some embodiments, the processor is further configured to perform operations including determining whether to trigger the coordination message before transmitting the PSCCH and the PSSCH to the receiving UE.

In some embodiments, determining whether to perform resource reselection includes skipping resource reselection for the subsequent transmission based at least on one of one or more conditions. The one or more conditions includes a level of interference at the receiving UE, processing time limitation, or data priority associated with the PSCCH and the PSSCH.

In some embodiments, performing resource reselection for a subsequent transmission includes reselecting all or a portion of the reserved resources based on the coordination message.

In some embodiments, the processor is further configured to perform operations including determining a period during which the collision occurs. The period is indicated in the coordination message. The processor is further configured to perform operations including performing resource reselection for the period during which the reserved resources collision occurs.

In some embodiments, the processor is further configured to perform operations including determining a period during which the collision occurs. The period is indicated in the coordination message. the processor is further configured to perform operations including performing resource reselection for subsequent periods after the period during which the collision occurs.

In another further aspect of the disclosure, embodiments of the present disclosure also provide a baseband processor configured to perform the processes as described above.

BRIEF DESCRIPTION OF THE DRAWINGS

The present invention is illustrated by way of example and not limitation in the figures of the accompanying drawings in which like references indicate similar elements.

FIG. 7 is an illustration of prioritization of PSFCH Transmission and Reception, according to some embodiments.

FIG. 8B is a flow diagram of some embodiments of dynamic coordination message transmission procedure by a receiving UE, according to some embodiments.

DETAILED DESCRIPTION

Figure 1:
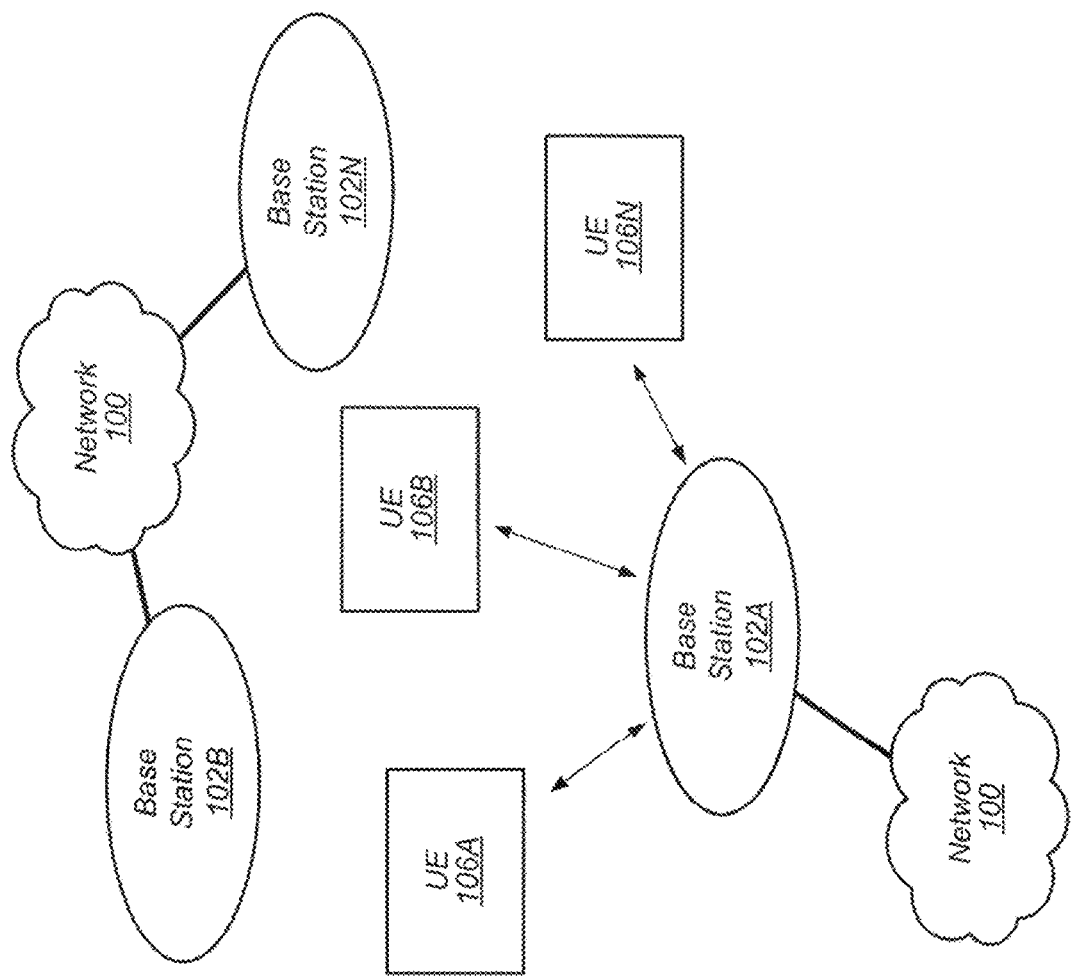
FIG. 1 illustrates an example wireless communication system, according to some embodiments.

A method and apparatus of a device that coordinates a sidelink resource between user equipment for use in sidelink communication is described. The embodiments of method and apparatus of device determines if there is a collision between the reserves resources by the transmitting UE. The receiving UE transmits the coordination message indicating the collision. The transmitting UE performs resource reselection and uses re-selected resources for the subsequent transmissions if the coordination message indicates a collision.

When implemented, these embodiments of method and apparatus of device can be applied to a reservation scheme for reserved resources or for future resource reservation. The receiving UE sends information to the transmitting UE. The information may not be a list of reserved resources. However, the receiving UE only provides input on specific resource reserved by the transmitting UE at a specific time slot and in a specific frequency. The receiving UE provides a specific indication via a coordination message whether the reserved resource is feasible or not. As a result, the size of feedback sent to the transmitting UE is smaller. This procedure can be applicable to reserved resources for reserved mechanism and not for an initial transmission.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a resource at a first user equipment (UE) for a sidelink communication from a second UE to the first UE is described. In an exemplary embodiment, the method receives a request from the second UE to send data to the first UE. In addition, the method determines a preconfigured resource selection window that is used by the second UE. Furthermore, the method determines a first sensing result at the first UE. The determined first sensing result includes information to be reported to the second UE for a resource selection. The determined first sensing result has a plurality of first sensing types. Further, the method transmits the first sensing result from the first UE to the second UE.

A method and apparatus of a device that selects a resource at a second user equipment (UE) for a sidelink communication from the second UE to a first UE is described. The method receives a first sensing result from a first UE. The first sensing result includes a plurality of first sensing types. Each of the plurality of first sensing types has a first information for a resource selection at the second UE. In addition, the method determines a second sensing result at the second UE. The determined second sensing result includes a second information and the determined second sensing result has a number of second sensing types. Furthermore, the method determines a combined sensing result based on the received first result and the determined second result. Additionally, the method selects the resource to transmit data from the second UE to the first UE based on the determined combined sensing result.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
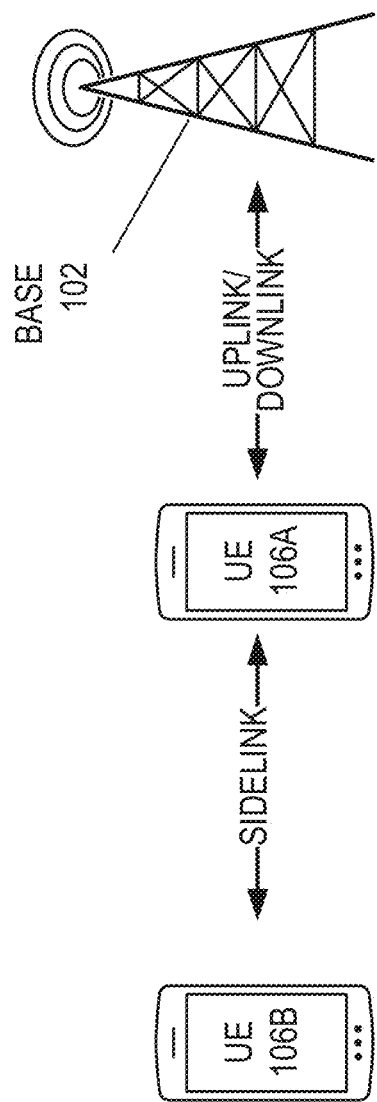
FIG. 2 illustrates a base station (BS) in communication with user equipments (UEs), according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
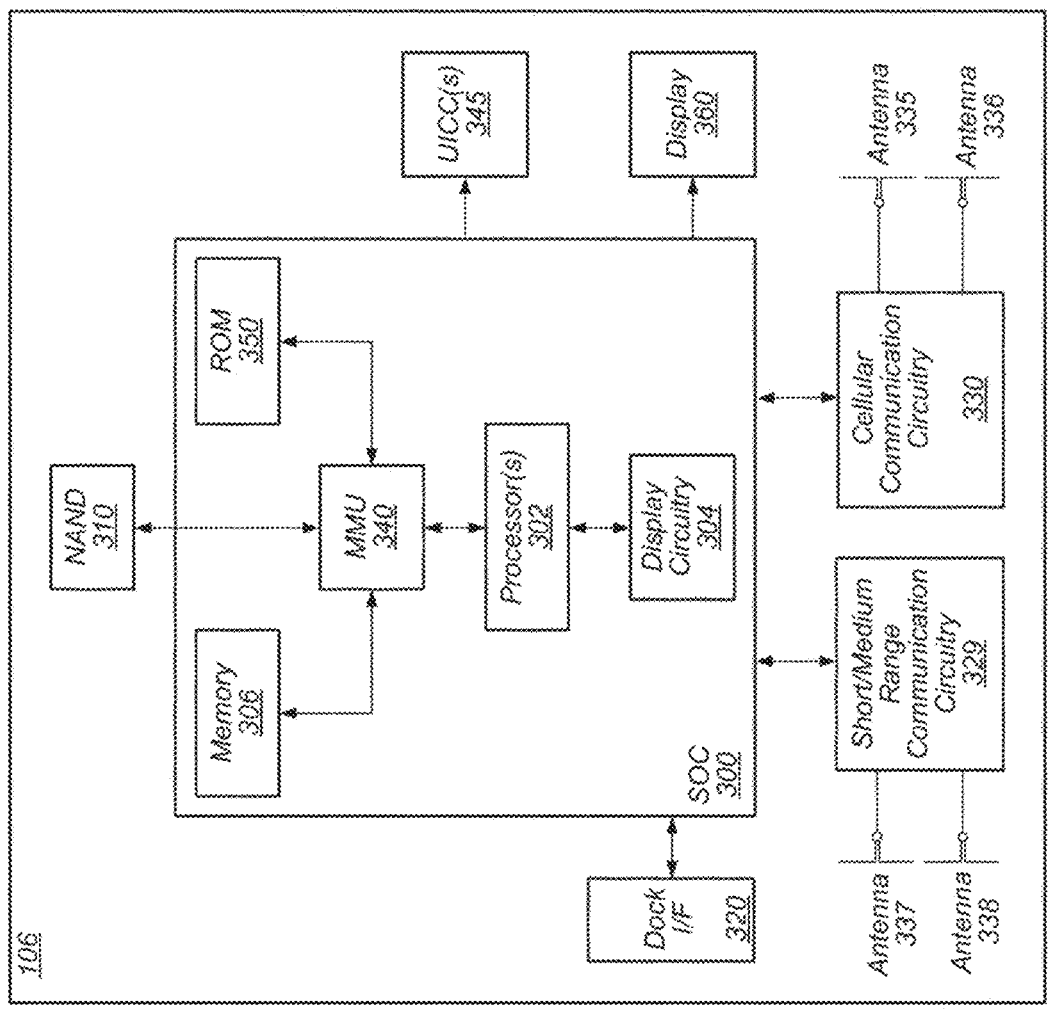
FIG. 3 illustrates an example block diagram of a UE, according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
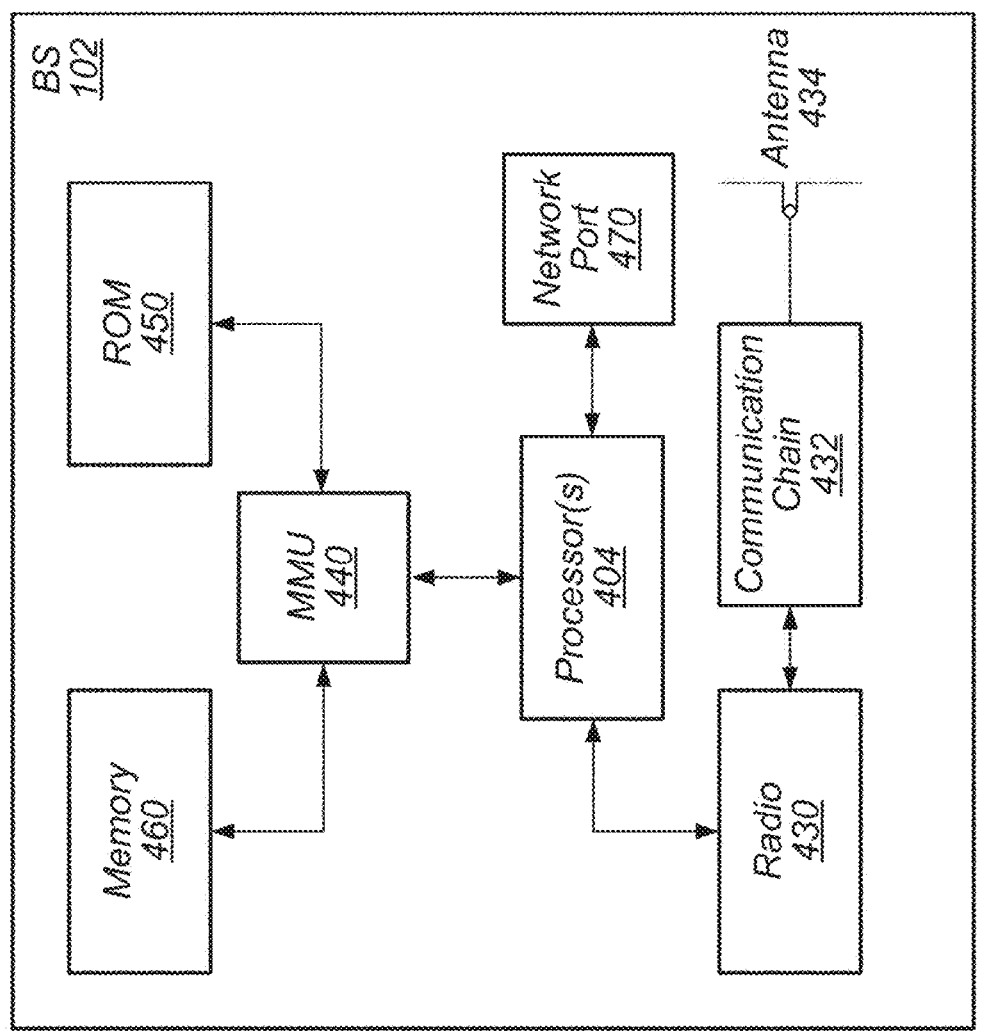
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
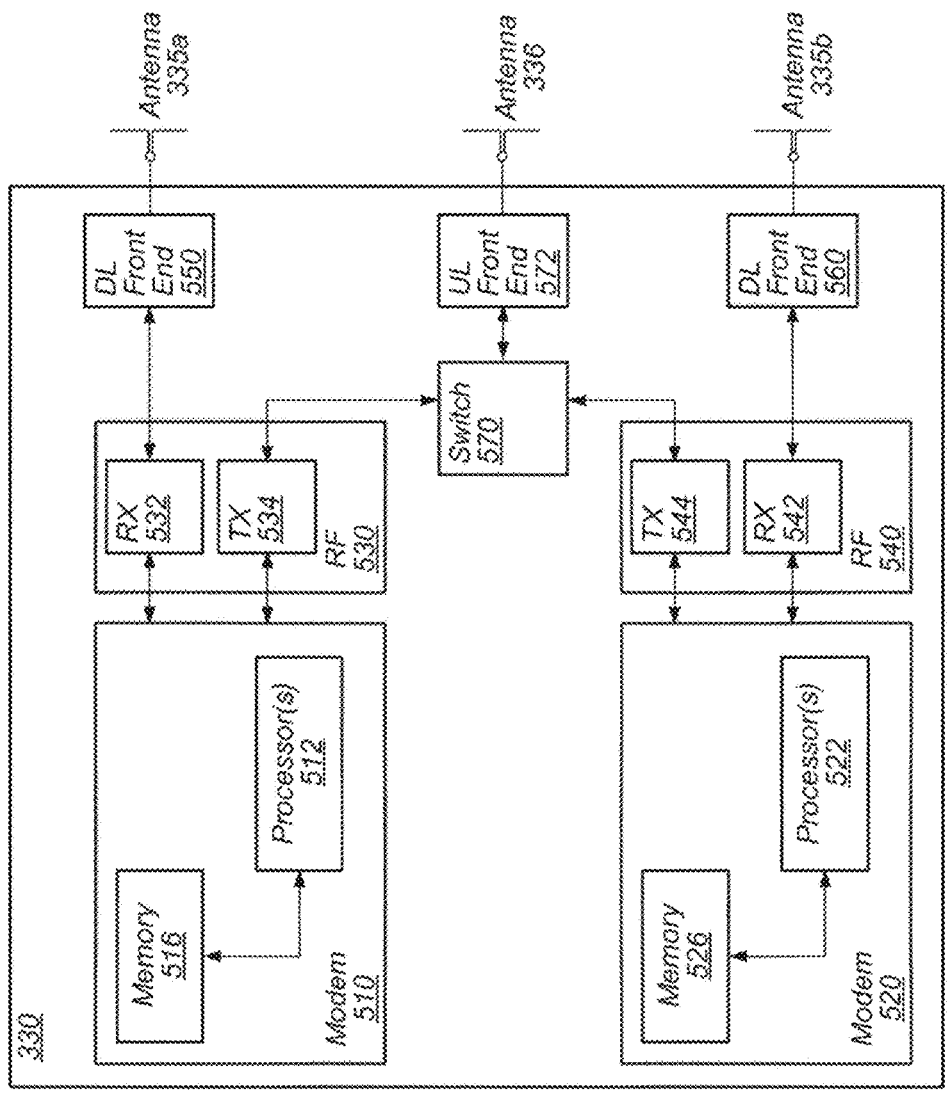
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
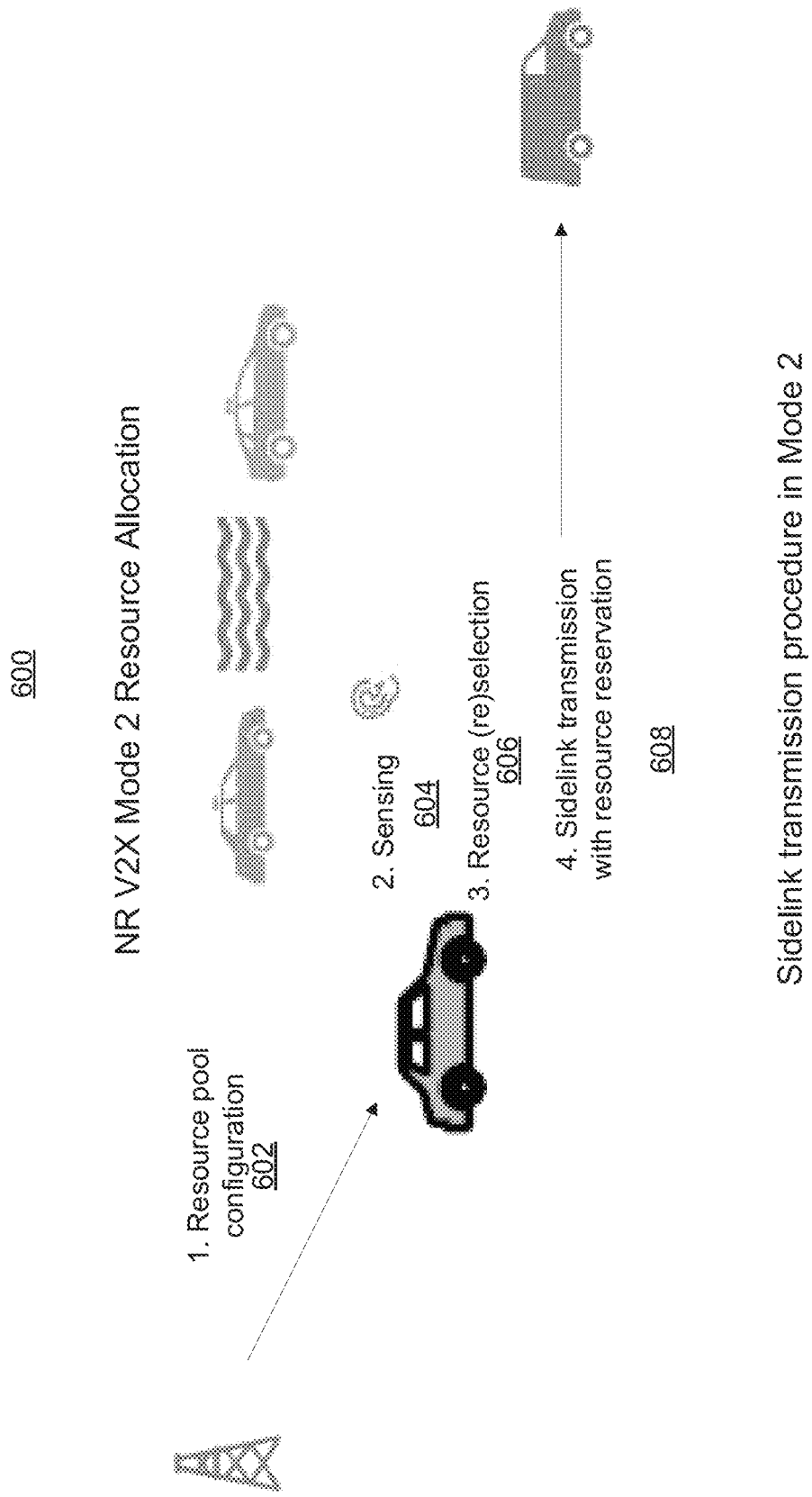
FIG. 6 is an illustration of sidelink transmission procedure in Mode 2, according to some embodiments.

FIG. 6 is an illustration of some embodiments of a resource allocation procedure 600 for NR V2X Mode 2. In NR V2X Mode 2, resource allocation procedure 600 can include UE determining sidelink transmission resource within a set of sidelink resources based on a network configuration or being pre-configured. The determination of the sidelink transmission resource can include four steps including resource pool (pre-) configuration 602, sensing 604 (sidelink data ready for transmission), resource selection and re-selection 606, and sidelink transmission with resource reservation 608. NR V2X direct sidelink communication without using the cellular network can enhance autonomous driving in use cases, for example, vehicles platooning, extended sensors, advanced driving, and remote driving. In vehicles platooning, NR V2X direct sidelink enable the vehicles to dynamically form a group travelling together. In extended sensor use cases, NR V2X direct sidelink enables the exchange of raw or processed data among vehicles, road side units, devices of pedestrians and V2X application servers. In advanced driving, NR V2X direct sidelink enables semi-automated or fully-automated driving. In remote driving, NR V2X direct sidelink enables a remote driver or a V2X application to operate a remote vehicle.

FIG. 7 is an illustration of some embodiments of prioritization of PSFCH transmission and reception procedure. PSFCH transmission and reception prioritization procedure 700 can be grouped into three scenarios.

In the first scenario 702, a UE transmits a PSSCH and receives SCI scheduling another PSSCH, where PSFCH resources corresponding to these two PSSCH appear in the same slot. PSFCH is selected based on data priority (in the associated SCI). For example, UE 2 transmits a PSSCH to UE 1. UE 1 will transmit PSFCH to UE 2 in response to the PSSCH transmission from UE 2. In this case, UE 2 receives PSFCH for this PSSCH transmission. At the same time, UE 3 transmits PSSCH to UE 2. UE 2 will transmit PSFCH to UE 3 in response to the PSSCH transmission from UE 3. Therefore, UE 2 will transmit and receive PSFCH in the same slot. As discussed above, PSFCH is selected based on data priority associated with the PSSCH transmission.

In the second scenario 704, a UE received SCI from different UEs and the associated PSFCHs appear in the same slot. N PSFCH transmissions are selected based on data priority. Maximum value of N is based on a UE capability. For example, UE 1 transmits a PSSCH to UE 2. UE 2 will transmit PSFCH to UE 1 in response to the PSSCH transmission from UE 1. In this case, UE 2 transmits PSFCH for this PSSCH transmission. At the same time, UE 3 transmits PSSCH to UE 2. UE 2 will transmit PSFCH to UE 3 in response to the PSSCH transmission from UE 3. Therefore, UE 2 will transmit PSFCH to UE 1 and UE 3 in the same slot. As discussed above, transmission of the PSFCH is selected based on data priority associated with the PSSCH transmission.

In the third scenario 706, a UE received multiple SCI from the same UE and the associated PSFCHs appear in the same slot. Select N PSFCH transmissions based on data priority. Maximum value of N is based on a UE capability. For example, UE 1 transmits a PSSCH to UE 2. UE 2 will transmit PSFCH to UE 1 in response to the PSSCH transmission from UE 1. In this case, UE 2 transmits PSFCH for this PSSCH transmission. At the same time, UE 1 transmits PSSCH to UE 2. UE 2 will transmit PSFCH to UE 1 in response to the PSSCH transmission from UE 1. Therefore, multiple transmissions of PSFCH to UE 1 in the same slot occur. As discussed above, transmission of the PSFCH is selected based on data priority associated with the PSSCH transmission.

Figure 8A:
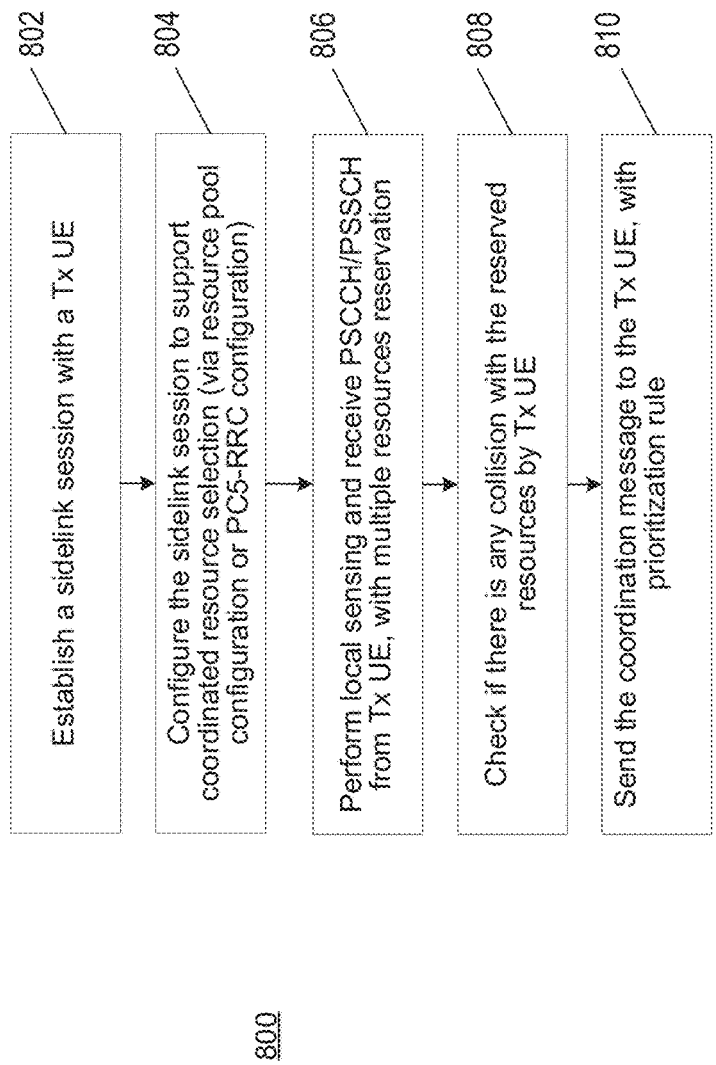
FIG. 8A is a flow diagram of some embodiments of configuration based coordination message transmission procedure by a receiving UE, according to some embodiments.

FIG. 8A illustrates a flow diagram of some embodiments of configuration based coordination message transmission procedure by a receiving UE. A receiving UE (e.g., 106B in FIG. 1) can include an antenna, a memory, an RF circuitry commutatively coupled to the antenna, and a processor configured to perform operations of process 800. For example, process 800 may be performed by the processor of the receiving UE. Process 800 describes embodiments of configuration based on coordination message transmission. In an exemplary embodiment, in operations 802, the receiving UE 106B can establish a sidelink session with a transmitting UE. After establishing the sidelink session, the receiving UE 106B configures the sidelink session to support coordinated resource selection in operations 804.

The receiving UE performs a local sensing and the local sensing procedure can be performed in parallel with operations 806 (will be discussed in details below). The sensing results used in operations 808 (will be discussed in details below) can be based on the sensing results obtained prior to operations 806 and the sensing results obtained after operations 806 but before operations 808. In some embodiments, the local sensing procedure is a continuous procedure, and the receiving UE will continuously perform sensing operations. The sensing window (e.g., a sliding window) used in the local sensing procedure can be as large as 1 second. In other words, the sensing window is set as (n−1 second, n), where n is the time to use sensing results. The receiving UE receives a PSCCH and a PSSCH from the transmitting UE in operations 806. The information about the reserved resource is received in operations 806, as part of the PSCCH/PSSCH from the transmitting UE. The transmitting UE reserves resources via the PSCCH in operations 806.

The receiving UE determines whether a collision happens among the multiple reserved resources based on the performed local sensing or UE scheduling information in operations 808. The receiving UE determines the availability of these reserved resources in operations 808. The sensing results used in operations 808 are based on the sliding sensing window as discussed above. Thereafter, in operations 810, the receiving UE transmitting the coordination message to the transmitting UE. Within operations 810, the receiving UE calculates a frequency resource for a coordination message. In addition, in operations 810, in some embodiments, the coordination message may not always be transmitted according to a prioritization rule. For example, if the receiving UE has both PSFCH and coordination message to send or receive, then the receiving UE may give up the transmission of coordination message based on the prioritization rule as will discussed in details later.

For the case of receiving UE's scheduling, if the receiving UE has scheduled a sidelink or uplink transmission in a slot, then the receiving UE may not be able to receive sidelink data from the transmitting UE in the same slot due to half duplex constraints.

The coordination message reflects both receiving UE sensing result and receiving UE's scheduling information.

The coordination message transmission can also be dynamic. FIG. 8B illustrates a flow diagram of some embodiments of dynamic coordination message transmission procedure by a receiving UE. Referring to FIG. 8B, in some other embodiments, the receiving UE (e.g., 106B) can establish a sidelink session with a transmitting UE in operations 822. After establishing the sidelink session, the receiving UE can optionally configure the sidelink session to support coordinated resource selection in operations 824. The receiving UE performs a local sensing and the local sensing procedure can be performed in parallel with operations 826 (will be discussed in details below). The sensing results used in operations 830 (will be discussed in details below) can be based on the sensing results obtained prior to operations 826 and the sensing results obtained after operations 826 but before operations 830. In some embodiments, the local sensing procedure is a continuous procedure, and the receiving UE will continuously perform sensing operations. The sensing window (e.g., a sliding window) used in the local sensing procedure can be as large as 1 second. In other words, the sensing window is set as (n−1 second, n), where n is the time to use sensing results.

The receiving UE receives a PSCCH and a PSSCH from the transmitting UE in operations 826. The transmitting UE reserves multiple resources. The information about the reserved resource is received in operations 826, as part of the PSCCH or the PSSCH from the transmitting UE. The receiving UE reserves resources via the PSCCH in operations 826. In operations 828, the receiving UE determines whether the coordination message is triggered before determining whether the collision happens among the multiple reserved resources. The PSCCH or the PSSCH as described in operations 826 indicates the triggering of the coordination message. In some embodiments, determining whether the coordination message is triggered includes monitoring an SCI signal to trigger a coordination message. The SCI signal having an SCI stage 2 can include an indication to trigger the coordination message. The SCI signal having a scrambling sequence for an SCI stage 2 can include an indication to trigger the coordination message.

The receiving UE determines whether a collision happens among the multiple reserved resources based on the performed local sensing or UE scheduling information in operations 830. Thereafter, the receiving UE transmits the coordination message to the transmitting UE in operations 832. Within operations 832, the receiving UE calculates a frequency resource for a coordination message.

In some embodiments, performing the local sensing, for example, includes decoding a sidelink control information (SCI) from neighboring UEs and measuring an interference level from the neighboring UEs.

In some embodiments, the coordination message includes information on a specific resource reserved by the transmitting UE at a specific time slot and in a specific frequency. The coordination message also includes an indication indicating whether the specific resource reserved by the transmitting UE is a preferred resource for a subsequent transmission.

In some other embodiments, the coordination message is applicable to reserved resources for a subsequent transmission. The subsequent transmission is either for a retransmission of data or for a transmission or a retransmission of a new data.

The physical layer channel of the coordination message could be different from the PSFCH. A new PSFCCH (Physical Sidelink Feedback Coordination Channel) is introduced to carry coordination message. Therefore, the coordination message is transmitted or received via a physical channel including a Physical Sidelink Feedback Coordination Channel (PSFCCH) or a Physical Sidelink Feedback Channel (PSFCH).

Because the resources of the PSFCCH and the PSFCH occur at the same time, a procedure for a prioritization of the PSFCH and the PSFCCH is established. In some embodiments, for example, the receiving UE determines whether the PSFCCH and the PSFCH are transmitted in the same slot. The receiving UE prioritizes a transmission of the PSFCH if the PSFCCH and the PSFCH are transmitted in the same slot. In this manner, the transmission of the PSFCH is always prioritized. The PSFCCH is considered as assistant message, so it is de-prioritized.

In these embodiments, the receiving UE determines data priority of the PSCCH associated with the transmission of the PSFCCH and the PSFCH. The data priority is indicated in the SCI. The receiving UE prioritizes the transmission of PSFCCH if the PSFCCH has a higher data priority. If the PSFCH has a higher data priority, the receiving UE prioritizes the transmission of PSFCH. In this manner, the physical channel (PSFCH or PSFCCH) that is associated with a higher data priority in PSSCH is prioritized.

In some other embodiments, the receiving UE determines a cast type associated with the PSFCH and PSFCCH. If the cast type includes a unicast or a groupcast Hybrid automatic repeat request (HARQ) option 2, the receiving UE prioritizes the transmission of PSFCCH. If the cast type includes a unicast or a groupcast Hybrid automatic repeat request (HARQ) option 2, the receiving UE prioritizes the transmission of PSFCH. In this manner, the physical channel associated with a sidelink unicast or sidelink groupcast HARQ option 2 is prioritized.

In some embodiments, the receiving UE determines whether the PSFCCH is transmitted and the PSFCH is received in the same slot. The receiving UE prioritizes the transmission of the PSFCCH or the reception of the PSFCH. In these embodiments, the receiving UE prioritizes the reception of the PSFCH.

In some other embodiments, the receiving UE determines data priority of the PSCCH associated with the transmission of the PSFCCH and the reception of the PSFCH. The data priority is indicated in the SCI. The receiving UE prioritizes the transmission of PSFCCH if the PSFCCH has a higher data priority. The receiving UE prioritizes the reception of PSFCH if the PSFCH has a higher data priority.

In some other embodiments, the receiving UE determines a cast type associated with the PSCFCH and PSFCCH. The receiving UE prioritizes the transmission of PSFCCH if the cast type includes a unicast or a groupcast Hybrid automatic repeat request (HARQ) option 2. The receiving UE prioritizes the reception of PSFCH if the cast type includes a unicast or a groupcast Hybrid automatic repeat request (HARQ) option 2.

In some embodiments, the receiving UE determines a congestion level of the physical channel. The receiving UE prioritizes the reception of the PSFCH if the congestion level of the physical channel is above a predetermined threshold. The receiving UE prioritizes the transmission of the PSFCCH if the congestion level of the physical channel is below the predetermined threshold.

In some embodiments, the receiving UE determines whether one or more PSFCCH are transmitted in the same slot. Then, the receiving UE determines data priority of the PSCCH associated with the transmission of the one or more PSFCCH. The data priority is indicated in the SCI. The receiving UE prioritizes the transmission of the PSFCCH associated with a higher data priority.

In these embodiments, the receiving UE determines a cast type associated with the one or more PSFCCH. The receiving UE prioritizes the transmission of the PSFCCH if the cast type includes a unicast or a groupcast Hybrid automatic repeat request (HARQ) option 2.

In some embodiments, the receiving UE determines whether the PSFCCH is transmitted and the PSFCCH is received in the same slot. The receiving UE prioritizes the transmission of the PSFCCH.

In some embodiments, the receiving UE determines data priority of the PSCCH associated with the transmission of the PSFCCH and the reception of the PSFCCH. The data priority is indicated in the SCI. The receiving UE prioritizes the transmission of PSFCCH if the PSFCCH has a higher data priority. The receiving UE prioritizes the reception of PSFCCH if the PSFCH has a higher data priority.

In these embodiments, the receiving UE determines a cast type associated with the transmission of the PSFCCH and the reception of the PSFCCH. The receiving UE prioritizes the transmission of the PSFCCH if the cast type includes a unicast or a groupcast Hybrid automatic repeat request (HARQ) option 2. The receiving UE prioritizes the reception of the PSFCCH if the cast type includes a unicast or a groupcast Hybrid automatic repeat request (HARQ) option 2.

In some other embodiments, the receiving UE determines a congestion level of the physical channel. The receiving UE prioritizes the reception of the PSFCCH if the congestion level of the physical channel is above a predetermined threshold. The receiving UE prioritizes the transmission of the PSFCCH if the congestion level of the physical channel is below the predetermined threshold.

In some embodiments, the transmission of the coordination message is triggered based on a pre-configuration of resources of the coordination message. In these embodiments, the transmission of the coordination message is triggered based on a configuration in a sidelink unicast or groupcast session.

In some other embodiments, the transmission of the coordination message is triggered based on the receiving UE decision. In some other embodiments, the transmission of the coordination message is triggered based on data quality of service (QOS), or a congestion level, or both.

In some embodiments, determining whether the coordination message is triggered (e.g., operations 830) includes monitoring an SCI signal to trigger a coordination message. The SCI signal having an SCI stage 2 can include an indication to trigger the coordination message. The SCI signal having a scrambling sequence for an SCI stage 2 can include an indication to trigger the coordination message.

In some embodiments, the coordination message is triggered based on a content of the PSFCH, wherein the content of the PSFCH includes ACK or NACK.

Figure 9A:
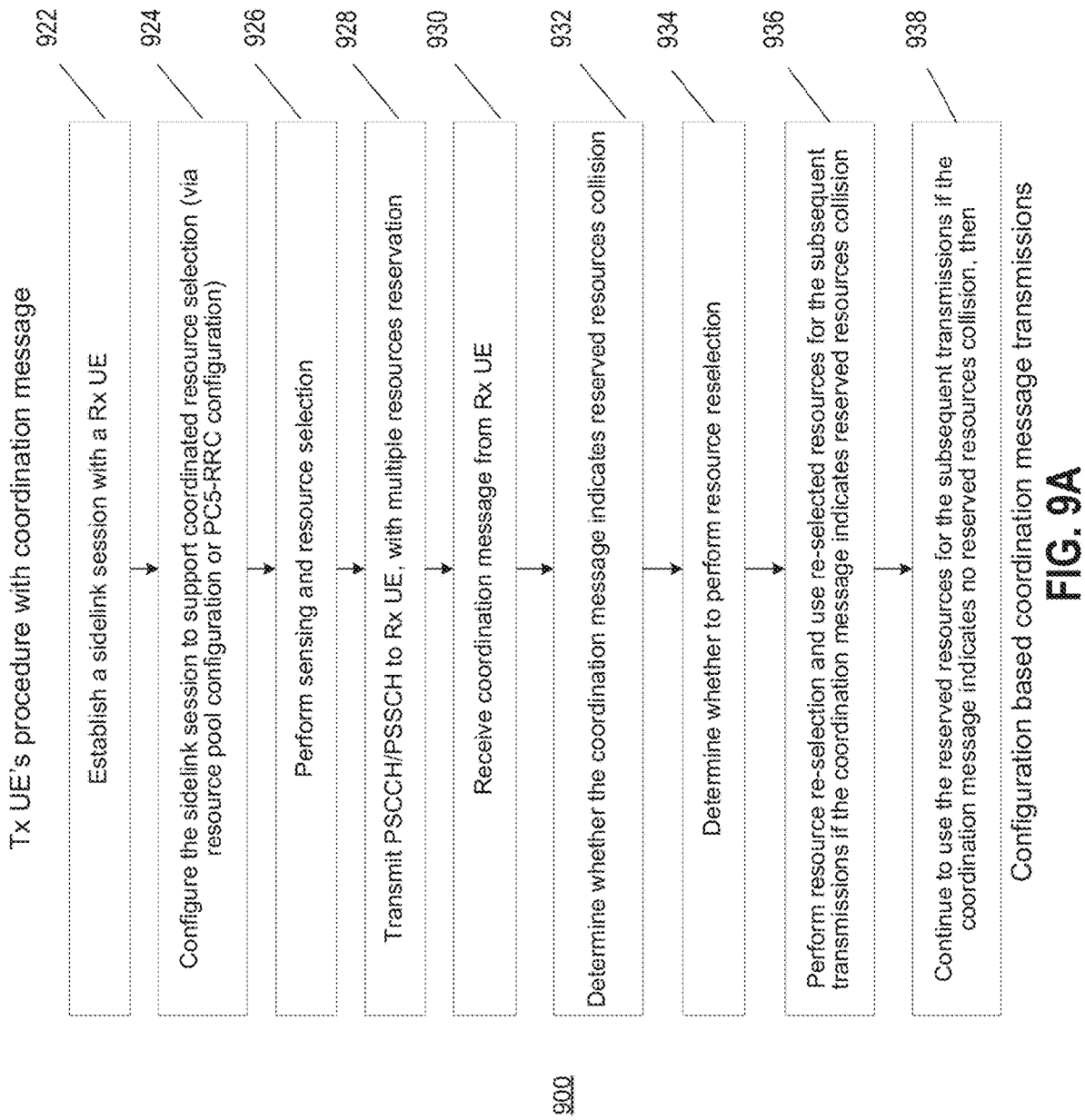
FIG. 9A is a flow diagram of some embodiments of configuration based coordination message transmission procedure by a transmitting UE, according to some embodiments.

FIG. 9A illustrates a flow diagram of some embodiments of configuration based coordination message transmission procedure by a transmitting UE. For example, process 900 may be performed by the processor of the transmitting UE. Process 900 describes embodiments of configuration based on coordination message transmission. In operations 922, the transmitting UE establishes a sidelink session with a receiving UE. Then, the transmitting UE configures the sidelink session to support coordinated resource selection prior to performing the local sensing in operations 924. The sidelink session can be configured via resource pool configuration or PC5-RRC configuration. In operations 926, the transmitting UE performs a sensing and resource selection. The transmitting UE transmits a PSCCH and a PSSCH to the receiving UE in operations 928. The transmitting UE reserves multiple resources. In operations 930, the transmitting UE receives a coordination message from the receiving UE. The coordination message can be received together with the PSFCH or PSFCCH. The transmitting UE determines whether the coordination message indicates reserved resources collision in operations 932. In operations 934, the transmitting UE determines whether to perform resource reselection. If the coordination message indicates reserved resources collision, the transmitting UE performs resource reselection for a subsequent transmission in operations 936. In operations 936, the transmitting UE performs the subsequent transmission using re-selected resources. The transmitting UE performs the subsequent transmission using the reserved resources if the coordination message does not indicate reserved resources collision in operations 940.

Figure 9B:
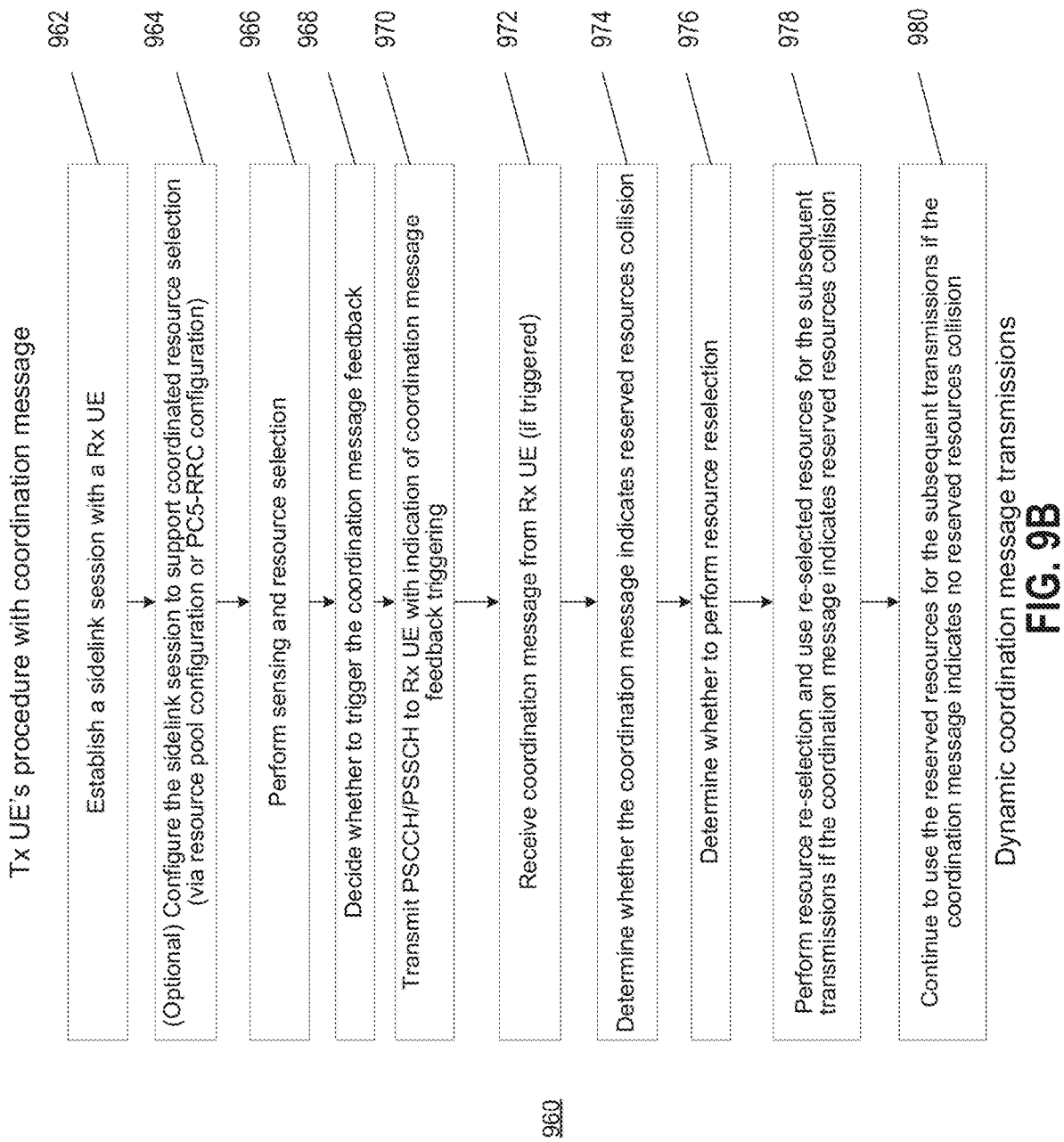
FIG. 9B is a flow diagram of some embodiments of dynamic coordination message transmission procedure by a transmitting UE, according to some embodiments.

The coordination message transmission can also be dynamic. FIG. 9B illustrates a flow diagram of some embodiments of dynamic coordination message transmission procedure by a transmitting UE. Referring to FIG. 9B, in some other embodiments, the transmitting UE (e.g., 106A) establishes a sidelink session with a receiving UE in operations 962. In operations 964, the transmitting UE can optionally configure the sidelink session to support coordinated resource selection prior to performing the local sensing. The transmitting UE performs a sensing and resource selection in operations 966. In operations 968, the transmitting UE determines whether to trigger the coordination message before transmitting the PSCCH and the PSSCH to the receiving UE. The transmitting UE transmits a PSCCH and a PSSCH to the receiving UE in operations 970. The transmitting UE reserves multiple resources. The transmitting UE receives a coordination message from the receiving UE in operations 972. The transmitting UE determines whether the coordination message indicates reserved resources collision in operations 974. In operations 976, The transmitting UE determines whether to perform resource reselection. The transmitting UE performs resource reselection for a subsequent transmission if the coordination message indicates reserved resources collision in operations 978. In operations 978, the transmitting UE uses the reselected resources for a subsequent transmission if the coordination message indicates reserved resources collision. The transmitting UE performs the subsequent transmission using the reserved resources if the coordination message does not indicate reserved resources collision in operations 980.

A third UE can also monitor the inter-UE coordination information for other UEs (i.e., transmitting UE, receiving UE). The third UE uses this information in its resource selection procedure. In some embodiments, if the third UE detects the coordination message from a receiving UE indicating transmitting UE's reserved resources, the third UE selects those resources if the Reference Signal Receive Power (RSRP) of the channel of carrying inter-UE coordination message is below a configured threshold. This implies that the receiving UE is far away from the third UE.

In some other embodiments, if the third UE detects the coordination message from a receiving UE indicating transmitting UE's reserved resources, it is determined if the RSRP of transmitting UE which reserves the resources is also low. This implies that the transmitting UE is far away from the third UE.

In some embodiments, determining whether to perform resource reselection (e.g., 976) includes skipping resource reselection for the subsequent transmission based at least on one or more conditions. The one or more conditions includes a level of interference at the receiving UE, processing time limitation, or data priority associated with the PSCCH and the PSSCH.

Transmitting UE may not trigger resource re-selection in case it receives the coordination message from Rx UE indicating reserved resource collision. Exceptional conditions may include one or a combination of the following:

In some embodiments, for sidelink groupcast, the UE may not trigger resource re-selection in case it receives the coordination message from Rx UE indicating reserved resource collision if a percentage or a number of receiving UEs indicating the reserved resource collision is below a predetermined threshold.

In some embodiments, the UE may not trigger resource re-selection in case it receives the coordination message from Rx UE indicating some reserved resource collision if other reserved resources do not have collision.

In some embodiments, the UE may not trigger resource re-selection in case it receives the coordination message from Rx UE indicating reserved resource collision if the level of interference at the receiving UE is not significant.

In some embodiments, the UE may not trigger resource re-selection in case it receives the coordination message from Rx UE indicating reserved resource collision if no resources are available at transmitting UE's location (within remaining packet delay budget).

In some embodiments, the UE may not trigger resource re-selection in case it receives the coordination message from Rx UE indicating reserved resource collision based on transmitting UE's processing time limitation.

In some embodiments, the UE may not trigger resource re-selection based on data priority. For example, low priority packet transmission can be dropped.

In some embodiments, the UE may not trigger resource re-selection based on transmitting UE's (pre) configured maximum number of resource re-selection trials. The maximum number of resource re-selection trials may be per priority level. If the maximum number of resource re-selection is reached, then the packet may be dropped.

In some embodiments, the UE may not trigger resource re-selection based on (pre) configured probability of transmissions. Probability can be configured value per priority packet i.e. high priority can have high probability and lower priority can have lower probability. This is for the case that, it is possible that other transmitter also got inter-UE coordination information and it is also backing off so instead of both colliding transmitter backing off, they back off in a probabilistic manner.

In some embodiments, the transmitting UE performs resource reselection for a subsequent transmission includes reselecting all or a portion of the reserved resources based on the coordination message. In some embodiments, transmitting UE may reselect all of the reserved resources (suitable for single-bit coordination message). In some embodiments, transmitting UE may reselect part of the reserved resources (suitable for multiple bits of coordination message).

In some embodiments, the transmitting UE determines a period during which the collision occurs, wherein the period is indicated in the coordination message. Then, the transmitting UE performs resource reselection for the period during which the reserved resources collision occurs. For example, when a resource collision occurs in one period, as indicated by coordination message, transmitting UE may reselect the resources in the period during which the collision occurs while maintaining the resources in other periods.

In some other embodiments, the transmitting UE determines a period during which the collision occurs, wherein the period is indicated in the coordination message. Then, the transmitting UE performs resource reselection for subsequent periods after the period during which the collision occurs. For example, in case of a resource collision in one period, as indicated by coordination message, transmitting UE may reselect the resources in the subsequent periods.

In some embodiments, the coordination message is received via a physical channel including a Physical Sidelink Feedback Coordination Channel (PSFCCH) or a Physical Sidelink Feedback Channel (PSFCH).

In some embodiments, the transmitting UE determines whether the PSFCH is transmitted and the PSFCCH are received in the same slot. The transmitting UE prioritizes the reception of the PSFCCH or the transmission of the PSFCH.

In these embodiments, the transmitting UE prioritizes the transmission of the PSFCH.

In some embodiments, the transmitting UE determines data priority of the PSCCH associated with the transmission of the PSFCH and the reception of the PSFCCH. The data priority is indicated in the SCI. The transmitting UE prioritizes the reception of PSFCCH if the PSFCCH has a higher data priority. The transmitting UE prioritizes the transmission of PSFCH if the PSFCH has a higher data priority.

In some embodiments, the transmitting UE determines a cast type associated with the PSFCH and PSFCCH. The transmitting UE prioritizes the reception of PSFCCH if the cast type includes a unicast or a groupcast Hybrid automatic repeat request (HARQ) option 2. The transmitting UE prioritizes the transmission of PSFCH if the PSFCH if the cast type includes a unicast or a groupcast Hybrid automatic repeat request (HARQ) option 2.

In some embodiments, the transmitting UE determines a congestion level of the physical channel. The transmitting UE prioritizes the reception of the PSFCCH if the congestion level of the physical channel is above a predetermined threshold. The transmitting UE prioritizes the transmission of the PSFCH if the congestion level of the physical channel is below the predetermined threshold.

In some embodiments, the transmitting UE determines whether the PSFCCH is transmitted and the PSFCCH is received in the same slot. The transmitting UE prioritizes the transmission of the PSFCCH.

In these embodiments, the transmitting UE determines data priority of the PSCCH associated with the transmission of the PSFCCH and the reception of the PSFCCH, wherein the data priority is indicated in the SCI. The transmitting UE prioritizes the transmission of PSFCCH if the PSFCCH has a higher data priority. The transmitting UE prioritizes the reception of PSFCCH if the PSFCH has a higher data priority.

In some embodiments, the transmitting UE determines a cast type associated with the transmission of the PSFCCH and the reception of the PSFCCH. The transmitting UE prioritizes the transmission of the PSFCCH if the cast type includes a unicast or a groupcast Hybrid automatic repeat request (HARQ) option 2. The transmitting UE prioritizes the reception of the PSFCCH if the cast type includes a unicast or a groupcast Hybrid automatic repeat request (HARQ) option 2.

In some embodiments, the transmitting UE determines a congestion level of the physical channel. The transmitting UE prioritizes the reception of the PSFCCH if the congestion level of the physical channel is above a predetermined threshold. The transmitting UE prioritizes the transmission of the PSFCCH if the congestion level of the physical channel is below the predetermined threshold.

In some embodiments, the coordination message is triggered based on a pre-configuration of resources of the coordination message. In these embodiments, the coordination message is triggered based on a configuration in a sidelink unicast or groupcast session. The coordination message is triggered based on the receiving UE decision. The coordination message is triggered based on data quality of service (QOS), or a congestion level, or both.

In some embodiments, the transmitting UE transmitting an SCI signal to trigger coordination message.

The SCI signal having an SCI stage 2 includes an indication to trigger the coordination message. The SCI signal having a scrambling sequence for an SCI stage 2 includes an indication to trigger the coordination message.

The coordination message is triggered based on a content of the PSFCH, wherein the content of the PSFCH includes ACK or NACK.

The triggering of the coordination message can be performed via enabling or disabling of the coordination message transmission. In some embodiments, transmission of the coordination message is optional only if the resources of coordination message are (pre) configured. In some other embodiments, the coordination message transmission can be enabled and disabled via a session based configuration. For example, the coordination message transmission can be enabled and disabled, or it can be configured in a sidelink unicast or groupcast session (e.g., during connection setup stage).

In some other embodiments, the coordination message transmission can be enabled and disabled via transmitting UE dynamic indication (e.g., SCI stage 2).

In some other embodiments, the coordination message transmission can be enabled and disabled via receiving UE's own decision.

In some other embodiments, the coordination message transmission can be enabled and disabled based on data QoS and congestion level (based on (pre) configuration).

The triggering of the coordination message can be performed via SCI signaling. For example, SCI stage 2 (formats 2-A, 2-B or new formats) may include an explicit indication of coordination message enabled/disabled. Alternatively, triggering coordination message may be carried in scrambling sequence for SCI stage 2.

In some embodiments, the processes or methods depicted in the preceding figures may be performed by a user equipment (UE) device including a processor.

In some other embodiments, the processes or methods depicted in the preceding figures may be performed by a baseband (BB) processor.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A user equipment (UE) comprising:
   an antenna;
   a memory;
   a RF circuitry commutatively coupled to the antenna; and
   a processor configured to perform operations comprising:
   establishing a sidelink session with a transmitting UE;
   configuring the sidelink session to support coordinated resource selection;
   performing a local sensing;
   receiving a Physical Sidelink Control Channel (PSCCH) and a Physical Sidelink Shared Channel (PSSCH) from the transmitting UE, wherein the transmitting UE reserves multiple resources;
   determining whether a collision occurs among the multiple reserved resources based on the performed local sensing or UE scheduling information;
   determining whether a Physical Sidelink Feedback Coordination Channel (PSFCCH) and a Physical Sidelink Feedback Channel (PSFCH) are to be transmitted by the UE in the same slot, and in response to determining that the PSFCCH and the PSFCH are to be transmitted by the UE in the same slot, prioritizing transmission of the PSFCH; and
   transmitting a coordination message to the transmitting UE.

2. The UE of claim 1, wherein the processor is further configured to perform operations comprising:
   determining whether the coordination message is triggered before determining whether the collision occurs among the multiple reserved resources.

3. A baseband (BB) processor of a user equipment (UE) in a wireless communication system, the BB processor being in communication with memory storing instructions that, when executed by the BB processor, causes the UE to perform operations comprising:
   establishing a sidelink session with a transmitting UE;
   configuring the sidelink session to support coordinated resource selection;
   performing a local sensing;
   receiving a PSCCH and a PSSCH from the transmitting UE, wherein the transmitting UE reserves multiple resources;
   determining whether a collision occurs among the multiple reserved resources based on the performed local sensing or UE scheduling information;
   determining whether a Physical Sidelink Feedback Coordination Channel (PSFCCH) and a Physical Sidelink Feedback Channel (PSFCH) are to be transmitted by the UE in the same slot, and in response to determining that the PSFCCH and the PSFCH are to be transmitted by the UE in the same slot, prioritizing transmission of the PSFCH; and
   transmitting a coordination message to the transmitting UE.

4. The BB processor of claim 3, wherein the operations further comprise:
   determining whether the coordination message is triggered before determining whether the collision occurs among the multiple reserved resources.

5. The BB processor of claim 4, wherein performing the local sensing comprises:
   decoding a sidelink control information (SCI) from neighboring UEs; and
   measuring an interference level from the neighboring UEs.

6. The BB processor of claim 4, wherein the coordination message comprises information on a specific resource reserved by the transmitting UE at specific time slot and in a specific frequency.

7. The BB processor of claim 6, wherein the coordination message comprises an indication indicating whether the specific resource reserved by the transmitting UE is a preferred resource for a subsequent transmission.

8. The BB processor of claim 4, wherein the coordination message is applicable to reserved resources for a subsequent transmission, and wherein the subsequent transmission is either for a retransmission of a data or for a transmission or a retransmission of a new data.

9. The BB processor of claim 4, wherein the coordination message is transmitted or received via the PSFCCH.

10. The BB processor of claim 9, wherein the operations further comprise:
    determining whether one or more PSFCCH are transmitted in a same slot;
    determining data priority of the PSCCH associated with the transmission of the one or more PSFCCH, wherein the data priority is indicated in the SCI; and
    prioritizing the transmission of the PSFCCH associated with a higher data priority.

11. The BB processor of claim 10, wherein the operations further compromise:
    determining a cast type associated with the one or more PSFCCH; and
    prioritizing the transmission of the PSFCCH if the cast type includes a unicast or a groupcast Hybrid automatic repeat request (HARQ) option 2.

12. The BB processor of claim 9, wherein the operations further comprise:
    determining whether the PSFCCH is transmitted and the PSFCCH is received in the same slot; and
    prioritizing the transmission of the PSFCCH.

13. The BB processor of claim 4, wherein the transmission of the coordination message is triggered based on a pre-configuration of resources of the coordination message.

14. The BB processor of claim 13, wherein the transmission of the coordination message is triggered based on a configuration in a sidelink unicast or groupcast session.

15. The BB processor of claim 13, wherein the transmission of the coordination message is triggered based on the receiving UE decision.

16. The BB processor of claim 13, wherein the transmission of the coordination message is triggered based on data quality of service (QOS), or a congestion level, or both.

17. The BB processor of claim 4, wherein determining whether the coordination message is triggered comprises:
    monitoring an SCI signal to trigger coordination message.

18. The BB processor of claim 4, wherein the coordination message is triggered based on a content of the PSFCH, wherein the content of the PSFCH include ACK or NACK.

19. A baseband (BB) processor of a transmitting user equipment (UE) in a wireless communication system, the BB processor being in communication with memory storing instructions that, when executed by the BB processor, causes the UE to perform operations comprising:
- establishing a sidelink session with a receiving UE;
- configuring the sidelink session to support coordinated resource selection;
- performing a sensing and resource selection;
- transmitting a PSCCH and a PSSCH to the receiving UE, wherein the transmitting UE reserves multiple resources;
- in response to determining that a PSFCH is to be transmitted by the transmitting UE in a same slot as a PSFCCH containing a coordination message is to be received by the transmitting UE, prioritizing transmission of the PSFCH over reception of the PSFCCH;
- receiving the coordination message from the receiving UE;
- determining whether the coordination message indicates reserved resources collision;
- determining whether to perform resource reselection;
- performing resource reselection for a subsequent transmission if the coordination message indicates reserved resources collision;
- performing the subsequent transmission using re-selected resources; and
- performing the subsequent transmission using the reserved resources if the coordination message does not indicate reserved resources collision.

20. The BB processor of claim 19, wherein the operations further comprise:
- determining whether to trigger the coordination message before transmitting the PSCCH and the PSSCH to the receiving UE.

* * * * *